(12) United States Patent
Fukamachi et al.

(10) Patent No.: US 7,784,335 B2
(45) Date of Patent: Aug. 31, 2010

(54) BRAKE SYSTEM TEST DEVICE AND BRAKE SYSTEM TEST METHOD OF TWO-WHEELED MOTOR VEHICLE

(75) Inventors: Kazuyuki Fukamachi, Sayama (JP); Masahiko Kaneko, Sayama (JP); Giuseppe Madonna, Chieti (IT); Nicola Perretti, Chieti (IT); Giovanni Papola, Chieti (IT)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 11/578,161

(22) PCT Filed: Sep. 9, 2005

(86) PCT No.: PCT/JP2005/016600

§ 371 (c)(1),
(2), (4) Date: Oct. 27, 2008

(87) PCT Pub. No.: WO2007/029332

PCT Pub. Date: Mar. 15, 2007

(65) Prior Publication Data

US 2009/0049901 A1    Feb. 26, 2009

(51) Int. Cl.
*G01M 17/007* (2006.01)
(52) U.S. Cl. ........................................... 73/121
(58) Field of Classification Search ........... 73/121–127, 73/130
See application file for complete search history.

(56) References Cited

U.S. PATENT DOCUMENTS 4,978,300 A * 12/1990 Letovsky et al. .............. 434/61

(Continued)

FOREIGN PATENT DOCUMENTS

CN    1639554 A    7/2005

(Continued)

OTHER PUBLICATIONS

Office Action dated Jun. 10, 2008 issued in the counterpart Japanese Patent Appln. No. JP2004-218502.

(Continued)

*Primary Examiner*—Lisa M Caputo
*Assistant Examiner*—Freddie Kirkland, III
(74) *Attorney, Agent, or Firm*—Kratz, Quintos & Hanson, LLP (57) ABSTRACT

Wheels of a two-wheeled motor vehicle are supported by support rollers corresponding to each wheel, respectively, and an antilock brake system is operated for each wheel. Measuring means 20 and 31 measure values related to the rotation speed of rollers supporting the wheel for which the antilock brake system operates. Based on the values obtained by the measuring means 20 and 31, the waveform accompanying the change in rotation speed of the wheel that occurs by the operation of the antilock brake system is computed by a computing means 44 based on the values obtained by the measuring means 20 and 31. A determination means 45 determines whether or not a portion of the waveform obtained by the computing means 44 falls within a predetermined range or not. According to the present brake system test of a two-wheeled motor vehicle, not only is it possible to specify the malfunctioning portion easily, but it is also possible to reduce the time required for each test of the motor vehicle dramatically, enabling the test of the two-wheeled motor vehicle to be performed with high accuracy and efficiency.

9 Claims, 5 Drawing Sheets

U.S. PATENT DOCUMENTS

| | | | | |
|---|---|---|---|---|
| 5,076,792 | A * | 12/1991 | Niermann | 434/61 |
| 5,209,662 | A * | 5/1993 | Fujita et al. | 434/61 |
| 5,364,271 | A * | 11/1994 | Aknin et al. | 434/61 |
| 5,495,753 | A * | 3/1996 | Watanabe et al. | 73/123 |
| 6,123,547 | A * | 9/2000 | Teresi | 434/61 |
| 6,505,503 | B1 * | 1/2003 | Teresi et al. | 73/118.01 |
| 7,134,326 | B2 * | 11/2006 | Fukamachi et al. | 73/121 |
| 7,406,862 | B2 * | 8/2008 | Madonna | 73/123 |

FOREIGN PATENT DOCUMENTS

| | | |
|---|---|---|
| JP | 04-372876 | 12/1992 |
| JP | 2001-281108 | 10/2001 |
| JP | 2003-254868 | 9/2003 |
| JP | 2003-254871 | 9/2003 |
| WO | WO 03074988 A1 * | 9/2003 |

OTHER PUBLICATIONS

Office Action dated Sep. 16, 2008 issued in the counterpart Japanese patent application No. JP2004-218502.

Office Action dated Sep. 18, 2009 corresponding to Chinese application No. 200580035883.9.

* cited by examiner

BRAKE SYSTEM TEST DEVICE AND BRAKE SYSTEM TEST METHOD OF TWO-WHEELED MOTOR VEHICLE

TECHNICAL FIELD

The present invention relates to a test device and a test method for testing an antilock brake system or a front-rear wheel interlock brake system with an antilock brake system provided on a two-wheeled motor vehicle.

BACKGROUND ART

Conventionally, there is known a device for testing the operation of an antilock brake system (hereinafter referred to as ABS) and a front-rear wheel interlock brake system (hereinafter referred to as CBS) of a two-wheeled motor vehicle (for example, refer to Japanese Patent Application Laid-Open Publication No. 2001-281108).

The above test device comprises a pair of front wheel support rollers (a first front wheel support roller and a second front wheel support roller) for seating and supporting the front wheel, and a pair of rear wheel support rollers (a first rear wheel support roller and a second rear wheel support roller) for seating and supporting the rear wheel, wherein the first front wheel support roller and the first rear wheel support roller are connected so that they are rotated in synchronization. In addition, each roller has its surface formed of a low friction material. Further, a rotation speed detecting means for detecting the rotation speed of each roller, respectively, are connected to the second front wheel support roller and the second rear wheel support roller. Furthermore, the first rear wheel support roller is connected to a driving motor via a clutch.

In order to test the ABS of a two-wheeled motor vehicle in the test device being arranged as above, at first, the front wheel and the rear wheel of the test vehicle is placed on the pair of front wheel support rollers and the pair of rear wheel support rollers, respectively, and the rear wheel support roller is rotated by the driving motor. Thereby, the first and second rear wheel support rollers are rotated in synchronization via the rear wheel, and the rotation is transmitted via the first front wheel support roller to the front wheel and the second front wheel support roller, so that all the rollers are synchronously rotated.

Thereafter, when the rotation speed of the roller obtained via the rotation speed detecting means reaches a predetermined speed, the clutch between the first rear wheel support roller and the driving motor is turned to an off state, at which time the operator fully inputs the brake. Then, the rollers cut off from the driving force of the driving motor by the clutch continues to rotate by inertia, and on the other hand, the rotation speed of each roller is reduced gradually by the reduction caused by the input of the brake. At this time, since the surface of each roller is formed of a low friction material, slip occurs between the wheels of the two-wheeled motor vehicle and each roller, and the ABS operates to perform a pumping brake. Thereafter, the respective rollers stop by the operation of the brake, and by comparing the stop time with the value determined in advance via actual drive measurement, it is determined whether the performance of the ABS is good (OK) or poor (NG). In addition, upon testing the CBS of the two-wheeled motor vehicle by the prior art test device, similar to the ABS test, one of the brakes (such as the front wheel brake) is input and the other brake (the rear wheel brake) is interlocked therewith, and by comparing the stop time of each roller with the value determined in advance via actual drive measurement, it is determined whether the performance of the CBS is OK or NG.

However, in the ABS test performed by the prior art test device, the determination results can only be obtained after the rotation of each of the support rollers are stopped after the brake is input, so there is a drawback in that the test time takes up a relatively long time. Even further, if the ABS test for the front wheel and the ABS test for the rear wheel are to be performed continuously, it is necessary that each of the support rollers being stopped when the front wheel test is ended must be driven up again to the rotation speed at which the rear wheel test can be carried out, so there is a drawback in that the test efficiency is deteriorated. Similarly in the CBS test, since the stop time and the stop distance are used for determination, the determination results can only be obtained after the rotation of the rollers are stopped after the brake is input, so that there is a drawback in that the test time takes up a relatively long time. Even further, since the confirmation of the operation of the CBS is performed based on the sensory of the operator, the operator is required to have much experience, and there is a drawback in that it is difficult to expect high test accuracy.

Even further, since according to the prior art test device, performance determination is performed by comparing the stop time of each roller with the values determined in advance via actual drive measurement, there is a drawback in that when the determination result is NG, it is impossible to specify whether the problem is caused by the control malfunction of the ABS or CBS, or by the braking force of the brake.

Furthermore, even if the surface of each roller is formed of a low friction material, if the rotation of each roller by inertia is not sufficient when the operator inputs the brake, there is a drawback in that it may not be possible to infallibly cause slip to occur between the wheels and the rollers corresponding to the actual on-road driving status.

SUMMARY OF THE INVENTION

The object of the present invention is to solve the problems mentioned above, and to provide a brake system test device and a brake system test method of a two-wheeled motor vehicle not only capable of specifying the malfunctioning area easily but also capable of reducing the time required for each test dramatically and performing the test of the two-wheeled motor vehicle in a highly accurate and efficient manner.

In order to achieve the above objects, the present invention provides a brake system test device of a two-wheeled motor vehicle for testing the operation of an antilock brake system provided on the two-wheeled motor vehicle, the device comprising: a pair of rotatable supporting rollers having axes arranged in parallel for supporting a front wheel of the two-wheeled motor vehicle; a pair of rotatable supporting rollers having axes arranged in parallel for supporting a rear wheel of the two-wheeled motor vehicle; a measuring means for measuring, when the antilock brake system operates for at least one of the two wheels of the two-wheeled motor vehicle, the rotation speed of said wheel via the supporting roller supporting said wheel; a computing means for computing, based on a value obtained by the measuring means, a waveform accompanying a change in the rotation speed of the wheel generated by the operation of the antilock brake system; and a determination means for determining that the brake system is OK when a portion of the waveform obtained via the computing means falls within a predetermined range during a predetermined lapse time, and determining that the brake system is NG when the waveform falls out of the predetermined range.

Upon testing the operation of an antilock brake system (ABS) of a two-wheeled motor vehicle by the device of the present invention, at first, the front wheel and the rear wheel are seated on each of a pair of support rollers corresponding respectively thereto. Next, the brake of the wheel (front wheel or rear wheel) for which the ABS operates which is the test object of the two-wheeled motor vehicle is input and the ABS is operated. Actually, for example, the operator drives the engine of the two-wheeled motor vehicle on the support rollers, and when the speed reaches a predetermined test start speed, the operator changes the gear of the two-wheeled motor vehicle to neutral and fully inputs the brake. Thereby, the wheels are caused to be in a harsh braking condition, by which a slip phenomenon occurs between the wheels and the roller and the ABS starts operating.

The brake is turned on and off repeatedly by the operation of the ABS, according to which the rotation speed of the wheel is increased and decreased, and the rotation speed of the wheel is measured by the measuring means via the supporting roller to which the rotational behavior of the wheel is transmitted. Then, based on the measured value obtained by the measuring means, the computing means computes a waveform corresponding to the change in rotation speed of the wheel (for example, the increase/decrease of deceleration or acceleration). Thereafter, the determination means determines whether or not a portion of the waveform obtained by the computing means falls within a predetermined range set within a predetermined lapse time. Since the waveform corresponds to the on and off of the brake, the wheel may be in a locked state or the wheel may not be sufficiently decelerated when no portion of the waveform falls within the predetermined range. Accordingly, it is possible to determine the performance of the ABS without having to measure the lapse time from the input of the brake to the stopping of the wheel, by utilizing the waveform computed by the computing means for the determination performed by the determination means.

Since according to the present invention, it is not necessary to measure the lapse time from the input of the brake to the stopping of the wheel, so the ABS test can be performed in a short time. Moreover, upon testing the rear wheel ABS subsequently to the front wheel ABS test, the test efficiency is improved since there is no need to stop the rotation of the wheels and rollers.

Regarding the computing means, it may be possible to determine the peak value accompanying the change in rotation speed of the wheel caused by the operation of the ABS based on the measured value obtained by the measuring means, and to determine that the system is OK when the peak value is within the predetermined range determined within the predetermined lapse time and NG when the peak value falls out of the predetermined range. However, if the change in rotation speed of the wheel caused by the operation of the ABS is gentle, it may be difficult to extract the peak value from the change. In this case, the operation of the ABS may be determined as NG since the peak value cannot be extracted, even if the operation should be determined as OK. Therefore, according to the computing means of the present invention, the waveform accompanying the change in rotation speed of the wheel is computed instead of the peak value, and this waveform is used to determine the performance of the system, so that even if the waveform is composed of smooth curves, the present invention can determine accurately whether or not the waveform falls within a predetermined range, eliminating erroneous NG determination and improving the test accuracy dramatically.

At this time, the determination means can determine that the brake system is NG when the waveform obtained by the computing means has a portion existing within the predetermined range and also having another portion exceeding an upper limit or falling below a lower limit of the predetermined range. Upon performing the performance determination based on the waveform, if the brake of the wheel is somewhat locked, even if the waveform has a portion thereof falling within the predetermined range, it may have another portion exceeding the upper limit or falling below the lower limit of the predetermined range within a predetermined lapse time. Therefore, the determination means can determine easily that the brake is somewhat locked based on the waveform, and by determining at this time that the brake system is NG, the test accuracy can be improved further.

Moreover, the present invention provides a brake system test method of a two-wheeled motor vehicle for testing the operation of an antilock brake system provided on the two-wheeled motor vehicle, the method comprising: a brake input step for rotating a front wheel of the two-wheeled motor vehicle supported by a pair of front wheel support rollers and also rotating a rear wheel of the two-wheeled motor vehicle supported by a pair of rear wheel support rollers and fully inputting a brake of one of the wheels for which the antilock brake system operates; a measuring step for measuring the rotation speed of the wheel for which the antilock brake system operates by the brake input step via the support roller supporting the wheel; a computing step for computing, based on the value measured during the measuring step, a waveform generated accompanying the change in rotation speed of the wheel by the operation of the antilock brake system; and a performance determination step for determining that the brake system is OK when a portion of the waveform obtained in the computing step falls within a predetermined range during a predetermined lapse time, and determining that the brake system is NG when the waveform falls out of the predetermined range.

According to the test method of the present invention, the rotation speed of the wheel is measured via the rollers in the measuring step, and thereafter, the waveform accompanying the speed change of the wheel is computed based on the measured value in the computing step. Thereafter, the performance determination based on the waveform is performed in the determination step. The waveform computed in the computing step corresponds to the on and off of the brake during operation of the ABS, as described earlier. Therefore, if the waveform falls out of the predetermined range, it may be possible that the wheel is locked or the deceleration is insufficient. Therefore, in the determination step, it is determined that the ABS is operating well if a portion of the waveform falls within the predetermined range, and it is determined that the ABS is malfunctioning if the waveform falls out of the predetermined range.

As described, since the present invention carries out the performance determination of the ABS in the computing step and the determination step based on the waveform corresponding to the on and off of the brake during operation of the ABS, the ABS test can be performed without having to measure the lapse time from the brake input to the stopping of the wheel, so the ABS test can be performed in a short time. Furthermore, even if the rear wheel ABS is to be tested subsequently to the front wheel ABS test, there is no need to stop the rotation of the wheel and the roller, so the test efficiency can be improved.

Moreover, as described earlier, it may be possible to perform performance determination based on the peak value accompanying the change in rotation speed of the wheel, but since the performance may be determined as NG if the peak value cannot be extracted, the present invention utilizes a waveform corresponding to the change in rotation speed of the wheel instead of the peak value for performance determination. Thereby, it becomes possible to accurately determine the performance of the ABS operation and to improve the test accuracy dramatically.

Furthermore, during the above-mentioned computing step of the test method of the present invention, it is preferable that a waveform is computed that includes at least a first transition portion representing the change in rotation speed of the wheel that occurs when the brake is initially turned off by the operation of the antilock brake system, a second transition portion representing the change in rotation speed of the wheel that occurs when the brake is subsequently turned on, and a third transition portion representing the change in rotation speed of the wheel that occurs when the brake is subsequently turned off; and during the performance determination process, the brake system is determined as being OK when each of the transition portions obtained during the computing step falls within a predetermined range within a predetermined lapse time set for each of the transition portions, respectively, and the brake system is determined as being NG when any one of the transition portions falls out of the predetermined range corresponding to the respective transition portions.

Initially when the operation of the ABS is started, the change in vehicle speed is greatest, so the variation of the acceleration and the deceleration corresponding to the rotation speed of the wheel is relatively large. Therefore, the first through third transition portions computed during the initial period of ABS operation clearly represent the operation status of the ABS. Therefore, by determining the operation of the ABS based at least on the first through third transition portions, the ABS test can be performed efficiently while maintaining sufficient determination accuracy. Furthermore, since it is possible to end the test at a relatively early stage after starting the ABS test, the test time can be cut down even further.

Furthermore, the brake system is determined as being NG when the waveform obtained by the computing means has a portion existing within the predetermined range and also having another portion exceeding an upper limit or falling below a lower limit of the predetermined range during a predetermined lapse time in the performance determination process. As described earlier, upon performing performance determination based on the waveform, if the brake of the wheel is somewhat locked, the waveform includes a portion exceeding the upper limit or falling below the lower limit of the predetermined range during the predetermined lapse time, even if a portion thereof exists within the predetermined range. Therefore, in the performance determination step, it can be easily determined based on the waveform that the brake is somewhat locked, and by determining that this system is NG, the test accuracy can be improved.

Moreover, the present invention provides a brake system test device of a two-wheeled motor vehicle for testing the operation of a front-rear wheel interlock brake system provided on the two-wheeled motor vehicle having an antilock brake system, the device comprising: a pair of rotatable front wheel supporting rollers having axes arranged in parallel for supporting a front wheel of the two-wheeled motor vehicle; a pair of rotatable rear wheel supporting rollers having axes arranged in parallel for supporting a rear wheel of the two-wheeled motor vehicle; a measuring means connected to one of the front wheel support rollers and one of the rear wheel support rollers, respectively, for measuring a rotation speed of the front wheel and a rotation speed of the rear wheel, respectively, via each of the rollers; a computing means for computing, based on the values measured via the respective measuring means, when the front wheel and the rear wheel are rotated in an interlocked manner and the antilock brake system is operated respectively for each of the front wheel and the rear wheel, a waveform representing a difference between a speed change of the front wheel occurring when the brake is initially turned off by the front wheel antilock brake system and the speed change of the rear wheel occurring when the brake is initially turned off by the rear wheel antilock brake system; and a determination means for determining that the brake system is OK when a portion of the waveform obtained by the computing means falls within a predetermined range, and determining that the brake system is NG when the waveform falls out of the predetermined range.

Furthermore, the present invention provides a brake system test method of a two-wheeled motor vehicle for testing the operation of a front-rear wheel interlock brake system provided on the two-wheeled motor vehicle having an antilock brake system, the method comprising: a brake input step of rotating a front wheel of the two-wheeled motor vehicle supported by a pair of front wheel support rollers and rotating a rear wheel of the two-wheeled motor vehicle supported by a pair of rear wheel support rollers, and fully inputting the brake for one of the wheels in order to operate the antilock brake system and the front-rear wheel interlock brake system; a measuring step for measuring a rotation speed of the front wheel and a rotation speed of the rear wheel during the brake input step via respective support rollers; a computing step for computing based on the measurements obtained in the measuring step, a waveform representing a difference between a speed change of the front wheel occurring when the brake is initially turned off by the operation of the front wheel antilock brake system and a speed change of the rear wheel occurring when the brake is initially turned off by the operation of the rear wheel antilock brake system; and a performance determination step for determining that the brake system is OK when a portion of the waveform obtained by the computing step falls within a predetermined range, and determining that the brake system is NG when the waveform falls out of the predetermined range.

Upon testing the front-rear wheel interlock brake system (CBS) of the two-wheeled motor vehicle according to the present invention, at first, the front wheel and the rear wheel are seated and supported on a pair of front wheel support rollers and a pair of rear wheel support rollers corresponding respectively thereto, and rotated thereon. Next, the brake of the wheel (front wheel or rear wheel) on which the ABS and the CBS are to be operated as the testing object of the two-wheeled motor vehicle are fully input to operate the ABS and the CBS (brake input step). Actually, when the rear wheel brake is interlocked with the input of the front wheel brake, the operator drives the engine of the two-wheeled motor vehicle on the supporting rollers, and when the speed reaches a predetermined test start speed, changes the gear of the two-wheeled motor vehicle to neutral and fully inputs the front wheel brake. Thereby, the front wheel will be in the state of harsh braking, by which a slip phenomenon occurs between the front wheel and the front wheel support rollers, and the front wheel ABS starts to operate. On the other hand, when the front wheel brake is input fully, the CBS operates and the rear wheel brake is input automatically. Thereby, similar to the front wheel, the rear wheel ABS starts to operate.

By the front wheel ABS and the rear wheel ABS operating together, the brake is turned on and off repeatedly for the front wheel and the rear wheel, respectively, and corresponding thereto, the rotation speed of the wheels are increased or decreased, and the rotation speed of the front wheel support roller and the rotation speed of the rear wheel support roller to which the rotational behavior of both wheels are conducted are measured by each measuring means (measuring step). Then, based on the respective measurement values acquired by the measuring means, the waveform representing the difference between the change in speed of the front wheel and the change in speed of the rear wheel is computed by the computing means (computing step). Then, whether or not a portion of the waveform obtained by the computing means falls within a predetermined range is determined by the determination means (determination step). The waveform computed by the computing means represents the performance of the rear wheel brake with respect to the front wheel brake, whereas if the waveform exceeds a predetermined range, it is possible that either the rear wheel brake is operated excessively with respect to the front wheel brake or the operation of the rear wheel brake is insufficient with respect to the front wheel brake. Therefore, by utilizing the waveform computed by the computing means for the determination performed by the determination means, it becomes possible to determine the performance of the CBS without having to measure the lapse time from brake input to stopping of wheels.

Furthermore, in the computing step, the waveform representing the difference between the change in speed at the time the initial time the brake of the front wheel is turned off by the operation of the ABS and the change in speed at the initial time the brake of the rear wheel is turned off by the operation of the ABS is used for performance determination. This is because initially when the ABS starts to operate, the change in vehicle speed is greatest, and the variation of acceleration and deceleration corresponding to the rotation speed of the wheel is relatively large, so that the operation statuses of the ABS of front and rear wheels are shown clearly. Thereby, it becomes possible to perform the CBS test efficiently while maintaining sufficient determination accuracy, and the test can be ended promptly, so the test time can be cut down dramatically.

Further, for example, in the computing step, it may be possible to use the difference between the peak value during the initial time the front wheel brake is turned off by the operation of the ABS and the peak value during the initial time the rear wheel brake is turned off by the operation of the ABS for performance determination, but if the speed change at the time the front wheel brake is initially turned off by the operation of the ABS or the speed change at the time the rear wheel brake is turned off by the operation of the ABS is extremely small, it will be difficult to extract the respective peak values. Therefore, by using the waveform representing the difference in change of speed instead of the difference in peak value for the performance determination, the performance of the CBS operation can be determined without fail, and the test accuracy can be improved dramatically.

In addition, upon determining the performance of the CBS operation in the performance determination step, the test accuracy can be improved by determining that the brake system is NG when the waveform obtained by the computing means has a portion thereof existing within the predetermined range and has another portion exceeding the upper limit of the predetermined range or falling below the lower limit thereof during a predetermined lapse time.

BEST MODE FOR CARRYING OUT THE INVENTION

One preferred embodiment for carrying out the present invention will be described with reference to the drawings. First, the structure of a test device 1 of a two-wheeled motor vehicle according to the present invention is described with reference to FIGS. 1 and 2, wherein reference number 2 denotes a base, 3 denotes a rear wheel stage disposed on the base 2 and placed on the side corresponding to the rear wheel R of the two-wheeled motor vehicle (not shown), and 4 denotes a front wheel stage disposed on the side corresponding to the front wheel F thereof.

Figure 1:
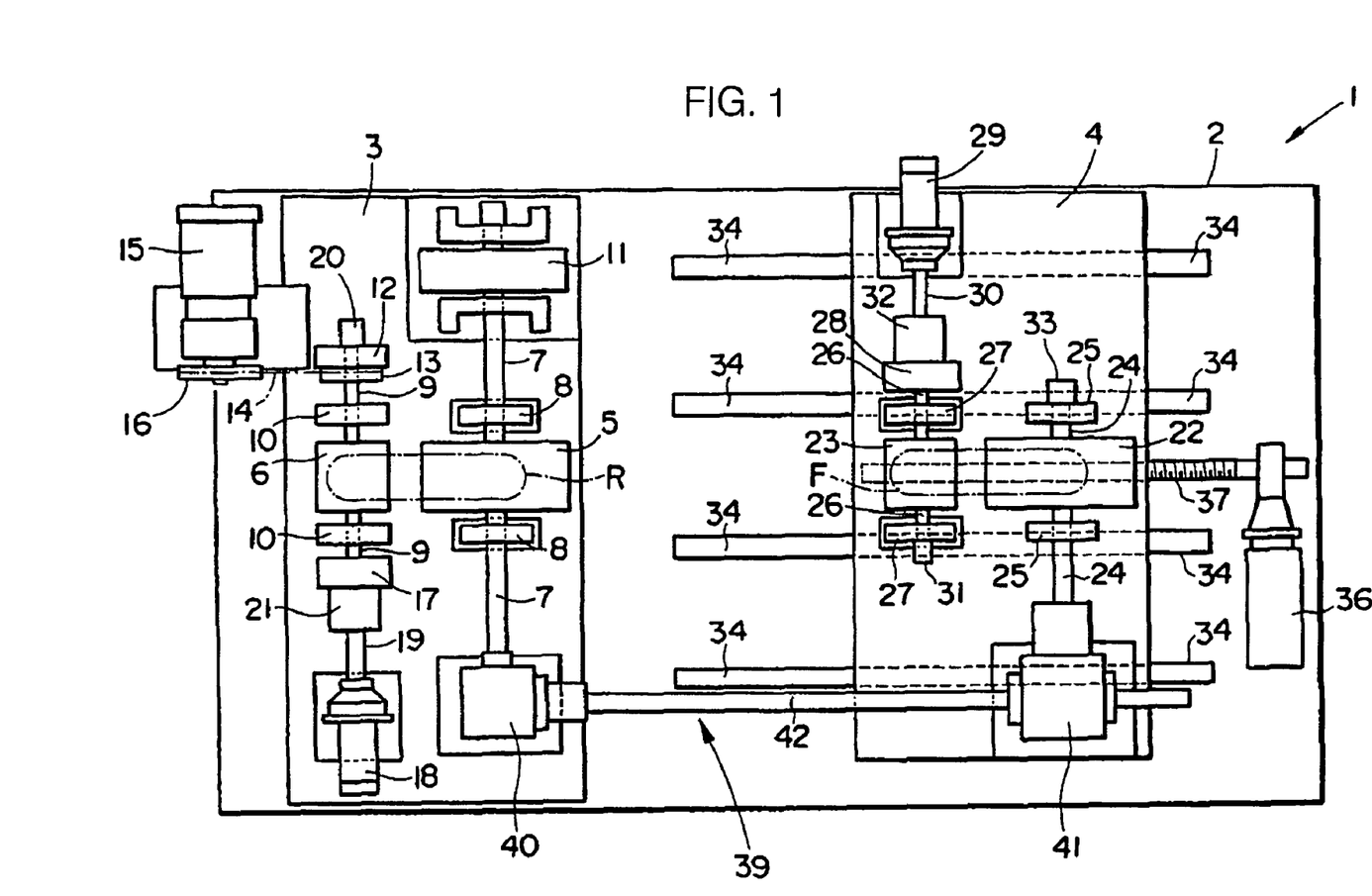
FIG. 1 is an explanatory plan view showing the arrangement of the device according to one embodiment of the present invention.

As shown in FIG. 1, the rear wheel stage 3 is equipped with a pair of rear wheel support rollers 5 and 6 for seating and supporting the rear wheel R of the two-wheeled motor vehicle. The first rear wheel support roller 5 positioned on the front side of the rear wheel R has its rotary shaft 7 supported rotatably via a pair of bearings 8. The second rear wheel support roller 6 positioned on the rear side of the rear wheel R has its rotary shaft 9 rotatably supported via a pair of bearings 10 in parallel with the rotary shaft 7 of the first rear wheel support roller 5. The first rear wheel support roller 5 is formed to have a larger diameter than the second rear wheel support roller 6, by which the rotary inertia of the first rear wheel support roller 5 is set larger than the second rear wheel support roller 6.

Figure 2:
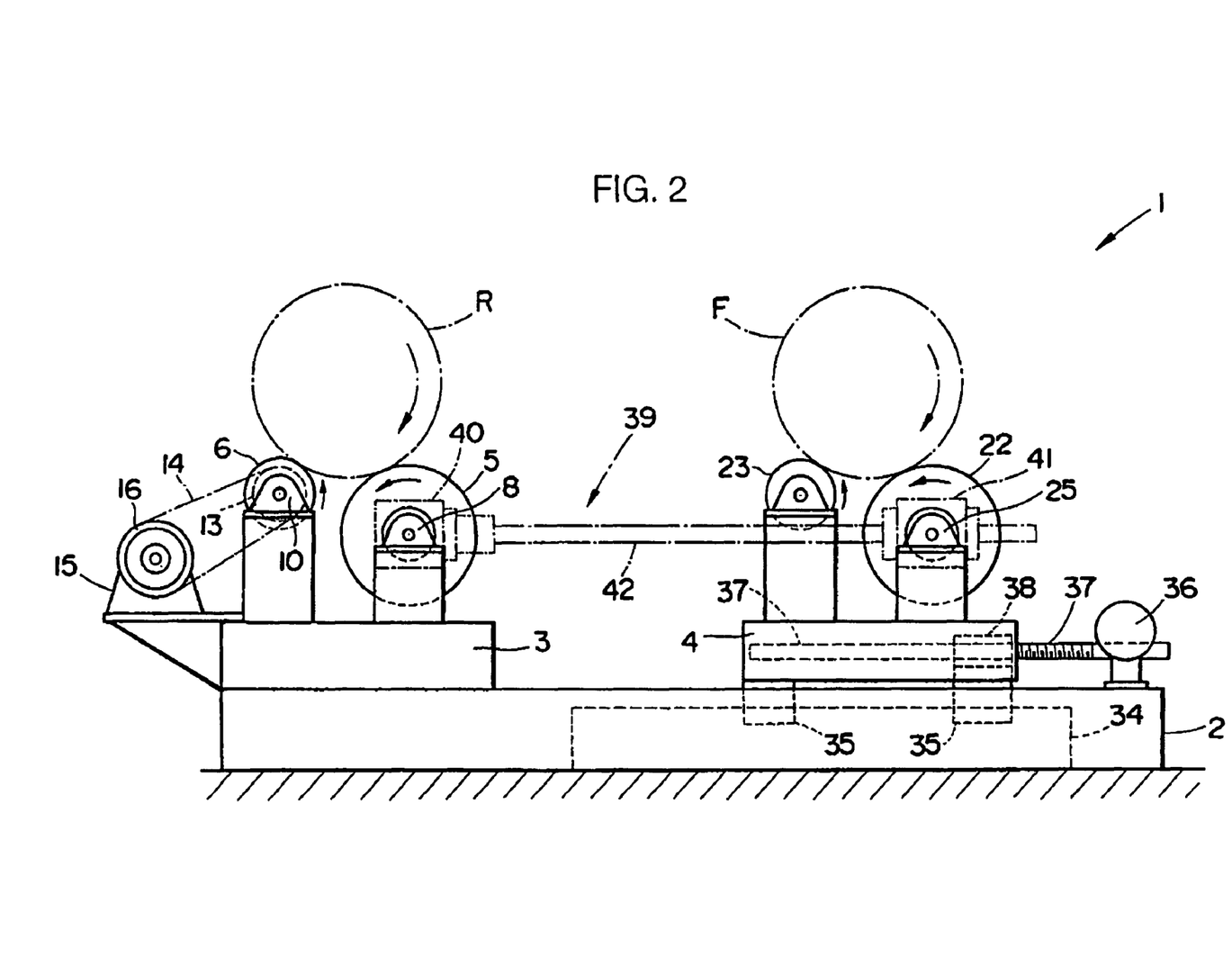
FIG. 2 is an explanatory side view showing the relevant portion of the device illustrated in FIG. 1.

The first rear wheel support roller 5 and the second rear wheel support roller 6 are aligned and spaced apart by a predetermined distance, and further, as shown in FIG. 2, the second rear wheel support roller 6 is supported by the bearings 10 so that the position in which the roller contacts the rear wheel R is at the same height as the first rear wheel support roller 5.

As shown in FIG. 1, an electromagnetic brake 11 is connected to one end of the rotary shaft 7 of the first rear wheel support roller 5, and the load applied to the first rear wheel support roller 5 can be controlled by the operation of the electromagnetic brake 11.

A pulley 13 is disposed via a clutch 12 on one end of the rotary shaft 9 of the second rear wheel support roller 6. The pulley 13 is driven by a pulley 16 of a starter driving motor 15 disposed on the base 2 with a belt 14 functioning as an interlocking member. When the clutch 12 is turned on, the pulley 13 is connected to the rotary shaft 9, enabling the starter driving motor 15 to drive the second rear wheel support roller 6.

Further, a motor 18 is connected via a clutch 17 to the other end of the rotary shaft 9 of the second rear wheel support roller 6. When the clutch 17 is turned on, the rotary shaft 9 is connected with a driving shaft 19 of the motor 18, enabling the motor 18 to drive the second rear wheel support roller 6.

Moreover, on one end of the rotary shaft 9 of the second rear wheel support roller 6 is disposed a first rotary encoder 20 for measuring the rotation speed of the rotary shaft 9, and on the other end of the rotary shaft 9 is disposed a first torque meter 21 positioned between the clutch 17 and the motor 18 for measuring the rotation torque of the rotary shaft 9. As will be described in detail later, the first torque meter 21 is used for testing the braking force, and the first rotary encoder 20 is used for testing the antilock brake system (ABS) and the front-rear wheel interlock brake system (CBS).

The front wheel stage 4 includes a pair of front wheel support rollers 22 and 23 for seating and supporting the front wheel F of the two-wheeled motor vehicle. The first front wheel support roller 22 positioned on the front side of the front wheel F is disposed so that its rotary shaft 24 is supported rotatably via a pair of bearings 25. The second front wheel support roller 23 positioned on the rear side of the front wheel F has its rotary shaft 26 rotatably supported via a pair of bearings 27 in parallel with the rotary shaft 24 of the front wheel support roller 22. The first front wheel support roller 22 is formed to have a larger diameter than the second front wheel support roller 23, by which the rotary inertia of the first front wheel support roller 22 is set larger than the second front wheel support roller 23.

The first front wheel support roller 22 and the second front wheel support roller 23 are aligned and spaced apart by a predetermined distance, and further, as shown in FIG. 2, the second front wheel support roller 23 is supported by the bearings 27 so that the position in which the roller contacts the front wheel F is at the same height as the first front wheel support roller 22. Here, the first rear wheel support roller 5 and the first front wheel support roller 22 are formed to have the same shape, and the second rear wheel support roller 6 and the second front wheel support roller 23 are also formed to have the same shape.

A motor 29 is connected via a clutch 28 to one end of the rotary shaft 26 of the second front wheel support roller 23. When the clutch 28 is turned on, the rotary shaft 26 is connected with a driving shaft 30 of the motor 29, enabling the motor 29 to drive the second front wheel support roller 23.

Moreover, on the other end of the rotary shaft 26 of the second front wheel support roller 23 is disposed a second rotary encoder 31 for measuring the rotation speed of the rotary shaft 26, and on the first end side of the rotary shaft 26 is disposed a second torque meter 32 positioned between the clutch 28 and the motor 29 for measuring the rotation torque of the rotary shaft 26. As will be described in detail later, the second torque meter 32 is used for testing the braking force, and the second rotary encoder 31 is used for testing the antilock brake system (ABS) and the front-rear wheel interlock brake system (CBS).

Furthermore, on one end of the rotary shaft 24 of the first front wheel support roller 22 is disposed a third rotary encoder 33 for measuring the rotation speed of the rotary shaft 24. As will be described in detail later, the third rotary encoder 33 is used for testing the speedometer mounted on the two-wheeled motor vehicle.

The front wheel stage 4 can be moved freely toward and away from the rear wheel stage 3 so as to correspond to two-wheeled motor vehicles having various distances between the wheels. In other words, as shown in FIG. 2, the front wheel stage 4 is equipped with guide members 35 guided along slide rails 34 disposed in the base 2 and a screw engagement member 38 screw-engaged to a ball screw 37 rotated by a motor 36. According to this arrangement, the front wheel stage 4 can be moved toward and away from the rear wheel stage 3 along the slide rails 34 by rotating the ball screw 37 via the motor 36.

Moreover, the first front wheel support roller 22 and the first rear wheel support roller 5 are rotated in synchronization via a connecting means 39. The connecting means 39 comprises a first gear box 40 connected to the rotary shaft 7 of the first rear wheel support roller 5 and a second gear box 41 connected to the rotary shaft 24 of the first front wheel support roller 22, wherein via a connecting shaft 42 connecting the first gear box 40 and the second gear box 41, the rotary shaft 7 and the rotary shaft 24 are rotated in synchronization. In addition, the first gear box 40 and the second gear box 41 are composed of well-known structures adopting a combination of bevel gears, and the connecting shaft 42 adopts a spline shaft in which the shaft is spline-engaged at the side of the second gear box 41 in order to have the second gear box 41 follow the aforementioned frontward-rearward movement of the front wheel stage 4.

Figure 3:
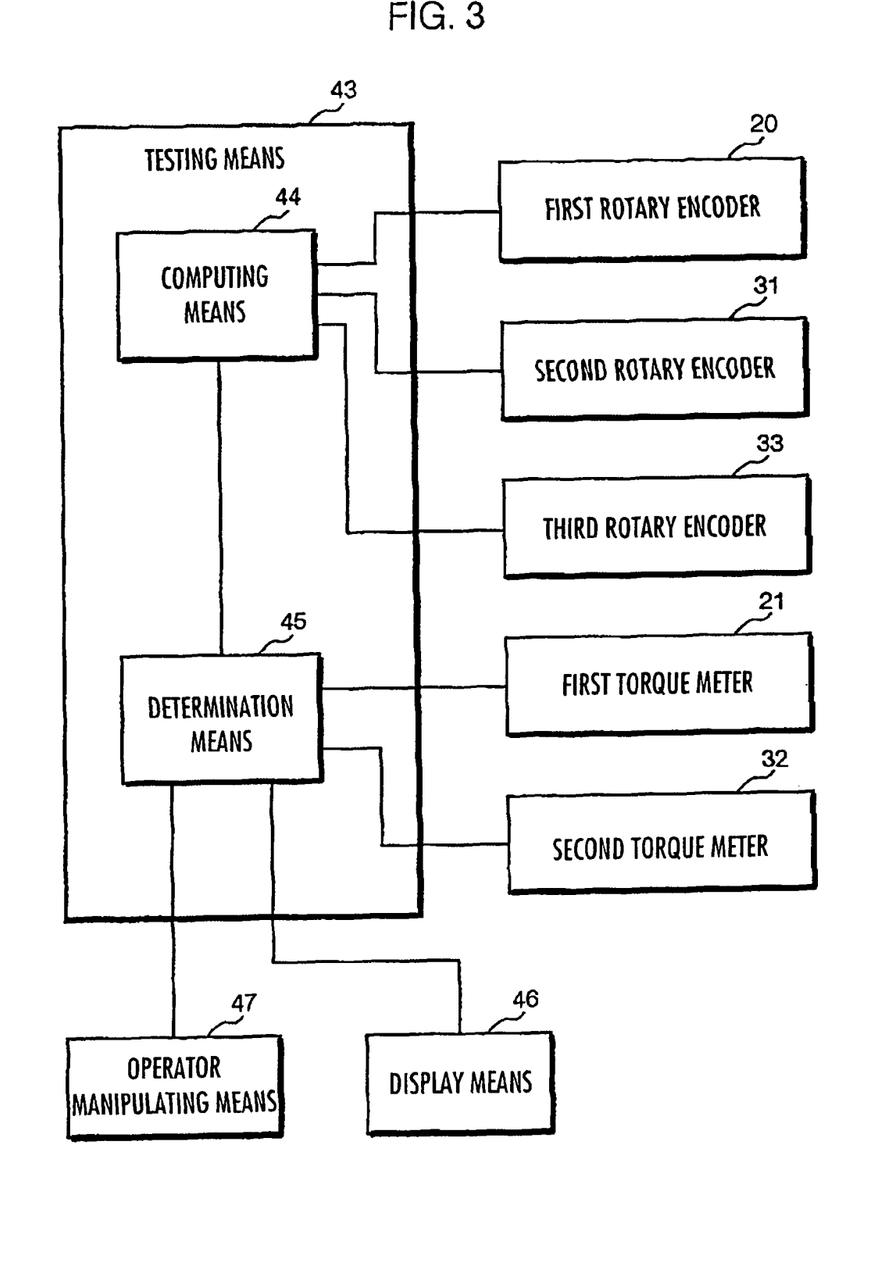
FIG. 3 is a block diagram showing a frame format of the testing means of the present embodiment.

As shown in FIG. 3, the first rotary encoder 20, the second rotary encoder 31, the third rotary encoder 33, the first torque meter 21 and the second torque meter 32 are connected to a testing means 43, wherein the measured values are respectively input to the testing means 43. The testing means 43 comprises a computing means 44 for performing computation based on the measured values corresponding to respective tests, and a determination means 45 for determining whether the respective tests are OK or NG. Furthermore, the testing means 43 includes a display means 46 for displaying the determined results of the determination means 45 and the measured data, and an operator manipulating means 47 manipulated by an operator riding on the two-wheeled motor vehicle. The computing process performed by the computing means 44 and the determination process performed by the determination means 45 will be described in detail later.

Next, the test for a two-wheeled motor vehicle according to the test device 1 of the present embodiment will be described. There is a wide variety of two-wheeled motor vehicles tested by the test device 1, and first, though not shown, the test on a two-wheeled motor vehicle having an ABS operating respectively for the front wheel brake and the rear wheel brake and a CBS operating to interlock the front wheel brake and the rear wheel brake will be described. In this type of two-wheeled motor vehicles, the front wheel brake operates when the driver manipulates only the right brake lever disposed on the handle, and the rear wheel brake operates in an interlocked manner. Further, when the driver operates only the brake pedal, the rear wheel brake will operate, and the front wheel brake operates in an interlocked manner. Furthermore, the ABS operates for both the front wheel brake and the rear wheel brake.

The test for this type of two-wheeled motor vehicles is performed in the named order; a front wheel braking force test, a rear wheel braking force test, a speedometer test, a front wheel ABS/CBS test, and a rear wheel ABS/CBS test.

The front wheel braking force test is performed in the following manner. Upon starting the test, in the state where the operator is riding on the two-wheeled motor vehicle, the rear wheel R of the two-wheeled motor vehicle is seated on the first rear wheel support roller 5 and the second rear wheel support roller 6, and the front wheel F is seated on the first front wheel support roller 22 and the second front wheel support roller 23. At this time, the engine of the two-wheeled motor vehicle is stopped and the gear is set to neutral. On the other hand, the test device is in the state where the clutch 12 is turned off, the pulley 13 and the rotary shaft 9 are separated, and the load generated by the motor 15, the pulley 16 and the belt 14 are not applied on the rotary shaft 9 and the second rear wheel support roller 6. Further, the clutch 17 is turned on, and the rotary shaft 9 is connected with the motor 18. Thereby, the motor 18 is enabled to drive the second rear wheel support roller 6 via the rotary shaft 9.

Thereafter, the operator riding on the two-wheeled motor vehicle operates only the right brake lever to fully input the front wheel brake, and while maintaining this status, presses a front brake braking force test start button not shown on an operator manipulating means 47 (shown in FIG. 3). Thereby, the motors 18 and 29 are operated, rotating the second rear wheel support roller 6 and the second front wheel support roller 23 for a predetermined time. At this time, since the operator operates the right brake lever of the two-wheeled motor vehicle to fully input the front wheel brake, the rotation of the front wheel F and the rear wheel R via the operation of the CBS are prevented, creating friction between the second front wheel support roller 23 or the second rear wheel support roller 6 and the front wheel F or the rear wheel R. Thereby, strain occurs to the rotary shaft 9 of the motor 18 and the second rear wheel support roller 6, and to the rotary shaft 26 of the motor 29 and the second front wheel support roller (23), and the torque applied on the second front wheel support roller 23 and the second rear wheel support roller 6 during full input of the front wheel brake is measured by the torque meters 28 and 21, the results of which are input to the aforementioned testing means 43. In the testing means 43, the torque values measured by the torque meters 28 and 21 are compared with predetermined torque values (determination values set in advance) in the determination means 45, and if the maximum value of the measured torque exceeds the predetermined torque value, the display means 46 displays "OK", but if the maximum value of the measured torque is equal to or smaller than the predetermined torque value, the display means 46 displays "NG" meaning that not enough braking force is achieved. Thereafter, if the braking force is determined as "NG"; the two-wheeled motor vehicle is removed from the test device 1 and the brake thereof is adjusted, whereas if the braking force is determined as "OK", the rear wheel braking force test is performed subsequently.

The rear wheel braking force test is performed after stopping motors 18 and 29 and stopping the rotation of the second rear wheel support roller 6 and the second front wheel support roller (23). The test operation is performed in a similar manner as the above-mentioned front wheel braking force test, except that the operator steps on the brake pedal while releasing the right brake lever to fully input the rear wheel brake, so detailed descriptions thereof are omitted.

After the rear wheel braking force test is ended, the speedometer test is performed subsequently. In the speedometer test, the performance of the speedometer mounted on the two-wheeled motor vehicle is tested. With reference to FIG. 1, the test device 1 is in the state described as follows. That is, the clutch 12 is turned off, the pulley 13 and the rotary shaft 9 are separated, and the load generated by the motor 15, the pulley 16 and the belt 14 is not applied on the rotary shaft 9 and the second rear wheel support roller 6. The clutch 17 is turned off, the rotary shaft 9, the motor 18 and the torque meter 21 are cut off, and the load generated by the motor 18 and the torque meter 21 are not applied on the rotary shaft 9 and the second rear wheel support roller 6. Similarly, the clutch 28 is turned off, and the load generated by the motor 29 and the torque meter 32 are not applied on the rotary shaft 26 and the second front wheel support roller 23.

Then, the operator starts the engine of the two-wheeled motor vehicle, and adjusts the accelerator while observing the speedometer on the two-wheeled motor vehicle. Then, when the speedometer of the two-wheeled motor vehicle shows a predetermined speed (for example, 40 km/h), the operator presses a speedometer test button not illustrated provided on the operator manipulating means 47 (shown in FIG. 3). On the other hand, as shown in FIG. 3, in the testing means 43, the rotation speed of the first rear wheel support roller 22 obtained in the third rotary encoder 33 is converted into the vehicle speed by the computing means 44. Then, the determination means 45 displays "OK" on the display means 46 if the difference between the value indicated on the speedometer of the two-wheeled motor vehicle and the vehicle speed computed by the computing means 44 at the time the speedometer test button is pressed is within a predetermined allowable range, and if it is not within the allowable range, displays "NG" on the display means 46 meaning that the accuracy of the speedometer of the two-wheeled motor vehicle is insufficient.

Thereafter, the front wheel ABS/CBS test is performed. In the front wheel ABS/CBS test, the drive of the engine of the two-wheeled motor vehicle is maintained continuously from the speedometer test, and the operator controls the accelerator to set the speed to a predetermined test start speed (for example, 60 km/h). At this time, the operator controls the accelerator not based on the speedometer provided on the two-wheeled motor vehicle but by confirming the vehicle speed displayed on the display means 46 via the testing means 43. By maintaining the drive of the engine of the two-wheeled motor vehicle, the rotation of the support rollers 5, 22, 6 and 23 are respectively maintained, according to which the speed rise time to the predetermined test start speed can be reduced dramatically.

When the vehicle speed reaches a predetermined test start speed, the operator returns the accelerator of the two-wheeled motor vehicle and sets the gear to neutral, and at the same time, operates the right brake lever to fully input the front wheel brake. According to this operation, harsh braking is applied to the front wheel F of the two-wheeled motor vehicle. In the test device 1, as shown in FIG. 2, the rotary inertia of the first rear wheel support roller 5 and the first front wheel support roller 22 are set greater than the rotary inertia of the second rear wheel support roller 6 and the second front wheel support roller 23, so that when the front wheel brake is fully input, a slip phenomenon occurs between the front wheel F and the first front wheel support roller 22, and the front wheel ABS starts to operate. On the other hand, the second front wheel support roller 23 follows the rotational behavior of the front wheel F. In addition, the first rear wheel support roller 5 is rotated in synchronization with the first front wheel support roller 22 via the connecting means 39, so the status of a road surface is also reproduced for the rear wheel R. Moreover, by the input of the front wheel brake of the two-wheel motor vehicle, the CBS operates and thus the rear wheel brake also operates. Further, the ABS of the rear wheel R of the two-wheeled motor vehicle operates following the front wheel F. At this time, similar to the case of the front wheel F, the second rear wheel support roller 6 follows the rotational behavior of the rear wheel R.

Figure 4:
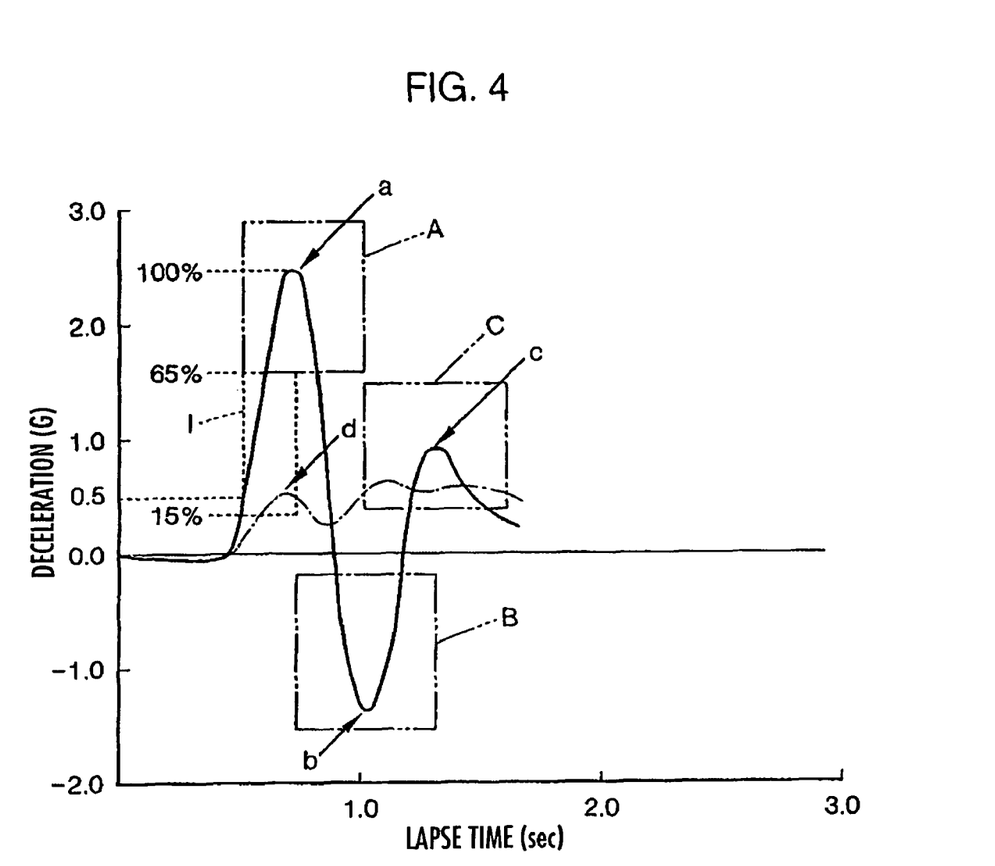
FIG. 4 is a chart showing waveforms used in the determination means.

In the testing means 43, the rotation speed of the second front wheel support roller 23 and the second rear wheel support roller 6 are constantly measured by the second rotary encoder 31 and the first rotary encoder 20, and based on the measured values, the process for computing the respective deceleration (acceleration) of the front wheel F portion and the rear wheel R portion via the computing means 44 is performed in the computing means 44. Waveforms corresponding to the deceleration (acceleration) obtained at this time is illustrated in FIG. 4. In FIG. 4, the waveform shown by the solid line represents the waveform of the deceleration (acceleration) of the front wheel F portion, that is, computed based on the number of rotation of the second front wheel support roller 23, and the waveform shown by the chain line represents the waveform of the deceleration (acceleration) of the rear wheel R portion, that is, computed based on the number of rotation of the second rear wheel support roller 6. According to the present embodiment, the waveform is described as a waveform of deceleration (acceleration), but the same waveform can be obtained by replacing deceleration with torque.

As shown in FIG. 4, according to the waveform of deceleration (acceleration) computed based on the number of rotation of the second front wheel support roller 23, the waveform rises (decelerates) simultaneously as when the front wheel brake is fully input, and then via a first transition portion a, the waveform drops (accelerates). The first transition portion a corresponds to the change in rotation speed of the second front wheel support roller 23 at the time the ABS is operated and the front wheel brake is initially turned off, and the drop that follows corresponds to the rotary inertia of the first front wheel support roller 22 being transmitted via the front wheel F to the second front wheel support roller 23.

Then, a second transition portion b appears in which the brake is turned on again, by which the second front wheel support roller 23 is decelerated. Thereafter, a third transition portion c appears in which the brake is turned off again, by which the second front wheel support roller 23 is accelerated. Thereafter, by the operation of the ABS, the front wheel brake is repeatedly turned on and off several times.

The waveform of the deceleration (acceleration) computed based on the number of rotation of the second rear wheel support roller 6 corresponds to the variation of rotation speed of the second rear wheel support roller 6, caused by the operation of the CBS interlocking the rear wheel brake with the front wheel brake, and the operation of the ABS of the rear wheel R. Then, a first transition portion d appears corresponding to the time in which the ABS is operated and the rear wheel brake is initially turned off.

According to the determination means 45 of the testing means 43, the first transition portion a, the second transition portion b and the third transition portion c are extracted from the waveform corresponding to the deceleration (acceleration) of the front wheel F portion, based on which the performance of the operation of the front wheel ABS is determined, and further, the first transition portion a from the waveform corresponding to the deceleration (acceleration) of the front wheel F portion and the first transition portion d from the waveform showing the deceleration (acceleration) of the rear wheel R portion are extracted, based on which the performance of the operation of the CBS is determined.

That is, as for the first transition portion a in the waveform corresponding to the deceleration (acceleration) of the front wheel F portion, a first acceptance area A set in advance (the area surrounded by the two-dot chain line of FIG. 4) is provided. The first acceptance area A is determined based on the upper limit and the lower limit of the allowable deceleration within a predetermined period of time, with the zero time reference set at the time when the deceleration computed by the computing means 44 based on the measured value of the second rotary encoder 31 (refer to FIG. 1) reaches 0.5 G (when it is assumed that the deceleration is based on the operation of the brake). As for the second transition portion b in the waveform of the deceleration (acceleration) of the front wheel F portion, a second acceptance area B set in advance is provided. The second acceptance area B is determined based on the upper limit and the lower limit of the allowable deceleration within a predetermined period of time, with the zero time reference set at the time when the first transition portion a appears. Similarly, as for the third transition portion c in the waveform of the deceleration (acceleration) of the front wheel F portion, a third acceptance area C set in advance is provided. The third acceptance area C is determined based on the upper limit and the lower limit of the allowable deceleration within a predetermined period of time, with the zero time reference set at the time when the second transition portion b appears.

First, the determination means 45 performs the performance determination of the operation of the front wheel ABS based on whether the first transition portion a, the second transition portion b and the third transition portion c fall within the first acceptance area A, the second acceptance area B and the third acceptance area C, respectively. That is, if all the transition portions a, b and c are within the respective acceptance areas A, B and C, the determination means displays "ABS OK" via the display means 46, but if even one of the transition portions fall out of range of the acceptance area, it displays "ABS NG" via the display means 46. Further at this time, even if a segment of the first transition portion a, the second transition portion b and the third transition portion c falls within the first acceptance area A, the second acceptance area B and the third acceptance area C, respectively, if another segment exceeds the upper limit or falls below the lower limit of the allowable deceleration within the predetermined period of time, the determination means displays "ABS NG" via the display means 46.

Now, various causes can affect the waveform, such as a pulled-out coupler, brake sensor malfunction, clogged pipe, air mix-in, pad alignment failure, sliding between rollers 5, 6, 22, 23 and wheels R and F, and erroneous operation such as the force or timing in applying the brake.

In addition, it may be possible to perform the performance determination of the operation of the front wheel ABS based on whether or not the peak value of each of the first transition portion a, the second transition portion b and the third transition portion c falls within the first acceptance area A, the second acceptance area B and the third acceptance area C, respectively, but in some waveforms, the curve may be too mild that it is difficult to extract the peak value. In such case, even if the operation of the front wheel ABS should be determined as OK, it may be determined as NG since the peak value could not be extracted. Therefore, by determining the performance based on the respective transition portions of the waveform rather than the peak value, it becomes possible to perform an accurate performance determination.

Simultaneously, the computing means 44 computes the difference between the value constituting the first transition portion a in the waveform of the deceleration (acceleration) of the front wheel F portion and the value constituting the first transition portion d in the waveform of the deceleration (acceleration) of the rear wheel R portion (in the present embodiment, the percentage of the first transition portion d of the rear wheel portion with respect to the first transition portion a of the front wheel portion), and the determination means 45 performs the performance determination of the operation of the CBS based on whether the computed value falls within a predetermined range I (65 to 15 percent of the first transition portion a of the front wheel portion). The designated predetermined range I is determined so that the timing and strength in which the rear wheel R is interlocked with the front wheel F is set to a most appropriate brake interlock distribution. Then, if the first transition portion d of the rear wheel portion falls within the predetermined range I, the determination means displays "CBS OK" via the display means 46, but if it falls out of range of the predetermined range I, it displays "CBS NG" via the display means 46. In addition, according to the present embodiment, since the percentage of the first transition portion d of the rear wheel portion with respect to the first transition portion a of the front wheel portion is adopted, the waveform of the first transition portion d of the rear wheel portion becomes equivalent to representing the difference between the value constituting the first transition portion a and the value constituting the first transition portion d. Further at this time, even if a portion of the first transition portion d of the rear wheel portion exists with in the predetermined range I, if the rest exceeds the upper limit or falls below the lower limit of the allowable deceleration within the predetermined period of time, the determination means displays "CBS NG" via the display means 46.

As described, according to the present embodiment, since the performance of the operation of the front wheel ABS is determined by extracting a first transition portion a, a second transition portion b and a third transition portion c from the waveform corresponding to the deceleration (acceleration) of the front wheel F portion, and the performance of the operation of the CBS is determined by extracting the first transition portion a from the waveform corresponding to the deceleration (acceleration) of the front wheel F portion and the first transition portion d from the waveform corresponding to the deceleration (acceleration) of the rear wheel R portion, the test can be ended in a relatively early stage after starting the front wheel ABS/CBS test, and the test time can be cut down dramatically.

Furthermore, in the waveform of the deceleration (acceleration) of the front wheel F portion, the transition of the waveform appears even after the third transition portion c, but according to well-known ABS properties, normally, the waveform transition appearing after the third transition portion c has relatively small fluctuation between acceleration and deceleration. In contrast, the speed transition is greatest when the first transition portion a, the second transition portion b and the third transition portion c appear in the initial stage of ABS operation, so the malfunction of the operation of the ABS will appear clearly. According to the present embodiment, since the performance is determined based on the first transition portion a, the second transition portion b and the third transition portion c in which the transition of the deceleration (acceleration) of the front wheel F portion appears relatively significantly, it becomes possible to realize a cut down of the determination time while maintaining a high determination accuracy.

Next, the rear wheel ABS/CBS test is performed. In the rear wheel ABS/CBS test, the drive of the engine of the two-wheeled motor vehicle is maintained in a continuous manner from the front wheel ABS/CBS test, and the operator controls the accelerator to set the speed to a predetermined test start speed (for example, 60 km/h). At this time, since the drive of the engine of the two-wheeled motor vehicle is maintained, the rotation of the support rollers 5, 22, 6 and 23 are respectively maintained, according to which the speed rise time to the predetermined test start speed can be cut down dramatically.

When the vehicle speed reaches a predetermined test start speed, the operator returns the accelerator of the two-wheeled motor vehicle and sets the gear to neutral, and at the same time, steps on the brake pedal to fully input the rear wheel brake. According to this operation, harsh braking is applied to the rear wheel R of the two-wheeled motor vehicle. In the test device 1, as shown in FIG. 2, the rotary inertia of the first rear wheel support roller 5 and the first front wheel support roller 22 are set greater than the rotary inertia of the second rear wheel support roller 6 and the second front wheel support roller 23, so that when the rear wheel brake is fully input, a slip phenomenon occurs between the rear wheel R and the first rear wheel support roller 5, and the rear wheel ABS starts to operate. On the other hand, the second rear wheel support roller 6 follows the rotational behavior of the rear wheel R. In addition, the first front wheel support roller 22 is rotated in synchronization with the first rear wheel support roller 5 via the connecting means 39, so that the status of the road surface is also reproduced for the front wheel F. Moreover, by the input of the rear wheel brake of the two-wheeled motor vehicle, the CBS operates and thus the front wheel brake is also operated. Further, the ABS of the front wheel F of the two-wheeled motor vehicle operates following the rear wheel R. Similarly at this time, the second front wheel support roller 23 follows the rotational behavior of the front wheel F.

Figure 5:
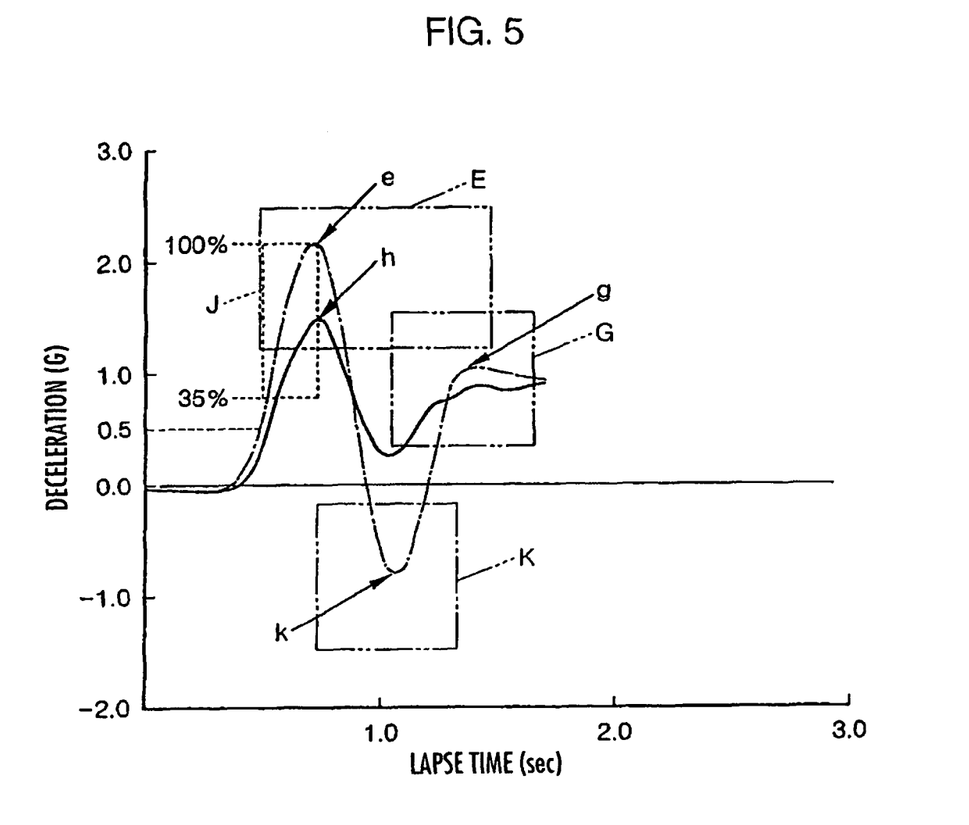
FIG. 5 is a chart showing waveforms used in the determination means.

In the testing means 43, similar to the front wheel ABS/CBS test, the rotation speed of the second rear wheel support roller 6 and the second front wheel support roller 23 are constantly measured by the first rotary encoder 20 and the second rotary encoder 31, and based on the measured value, the process for computing the deceleration (acceleration) of the rear wheel R portion and the front wheel F portion, respectively, is performed in the computing means 44. Waveforms corresponding to the deceleration (acceleration) obtained at this time is illustrated in FIG. 5. In FIG. 5, the waveform shown by the chain line represents the waveform of the deceleration (acceleration) of the rear wheel R portion, that is, computed based on the number of rotation of the second rear wheel support roller 6, and the waveform shown by the solid line represents the waveform of the deceleration (acceleration) of the front wheel F portion, that is, computed based on the number of rotation of the second front wheel support roller 23. According to the present embodiment, the waveform is described as a waveform of the deceleration (acceleration), but the same waveform can be obtained by replacing the deceleration with torque.

As shown in FIG. 5, according to the waveform of the deceleration (acceleration) computed based on the number of rotation of the second rear wheel support roller 6, the waveform rises (decelerates) simultaneously as when the rear wheel brake is fully input, and then via a first transition portion e, the waveform drops (accelerates). The first transition portion e corresponds to the change in rotation speed of the second rear wheel support roller 6 at the time the ABS is operated and the rear wheel brake is in the initial off status, and the drop that follows corresponds to the rotary inertia of the first rear wheel support roller 5 being transmitted via the rear wheel R to the second rear wheel support roller 6.

Then, a second transition portion k appears in which the brake is turned on again, at which time the second rear wheel support roller 6 is decelerated. Thereafter, a third transition portion g appears in which the brake is turned off again, at which time the second rear wheel support roller 6 is accelerated. Thereafter, by the operation of the ABS, the rear wheel brake is repeatedly turned on and off several times.

The waveform of the deceleration (acceleration) computed based on the number of rotation of the second front wheel support roller 23 corresponds to the change in rotation speed of the second front wheel support roller 23, caused by the operation of the CBS interlocking the front wheel brake with the rear wheel brake, and the operation of the ABS of the front wheel F. Then, a first transition portion h appears corresponding to the time in which the front wheel brake is initially turned off by the operation of the ABS.

First, the determination means 45 of the testing means 43 performs the performance determination in a similar manner as the aforementioned front wheel ABS/CBS test. That is, the determination means 45 performs the performance determination of the operation of the front wheel ABS based on whether the first transition portion e, the second transition portion k and the third transition portion g fall within the first acceptance area E, the second acceptance area K and the third acceptance area G, respectively, and if all the transition portions e, k and g fall within the respective acceptance areas E, K and G, the determination means displays "ABS OK" via the display means 46, but if even one of the transition portions fall out of range of the acceptance area, it displays "ABS NG" via the display means 46. Further at this time, even if a portion of the first transition portion e, the second transition portion k and the third transition portion g falls within the first acceptance area E, the second acceptance area K and the third acceptance area G, respectively, if another portion exceeds the upper limit or falls below the lower limit of the allowable deceleration within the predetermined period of time, the determination means displays "ABS NG" via the display means 46.

In addition, it is also possible to perform the performance determination of the operation of the front wheel ABS based on whether or not the peak value of each of the first transition portion e, the second transition portion k and the third transition portion g falls within the first acceptance area E, the second acceptance area K and the third acceptance area G, respectively, but in some waveforms, the curve may be too mild that it is difficult to extract the peak value. In such case, even if the operation of the front wheel ABS should be determined as OK, it may be determined as NG since the peak value could not be extracted. Therefore, by determining the performance based on the respective transition portions of the waveform rather than the peak value, it becomes possible to perform an accurate performance determination.

Simultaneously, the computing means 44 computes the difference between the value constituting the first transition portion e in the waveform of the deceleration (acceleration) of the rear wheel R portion and the value constituting the first transition portion h in the waveform of the deceleration (acceleration) of the front wheel F portion (in the present embodiment, the percentage of the first transition portion h of the front wheel portion with respect to the first transition portion e of the rear wheel portion), and the determination means 45 performs the performance determination of the operation of the CBS based on whether the computed value falls within a predetermined range J (100 to 35 percent of the first transition portion e of the rear wheel portion). Then, if the first transition portion h of the front wheel portion falls within the predetermined range J, the determination means displays "CBS OK" via the display means 46, but if it falls out of the predetermined range J, it displays "CBS NG" via the display means 46.

In addition, according to the present embodiment, the object of the test is a two-wheeled motor vehicle in which the ABS operates for both the front wheel brake and the rear wheel brake, respectively, and by inputting only the front wheel brake, the CBS operates to interlock the rear wheel brake, whereas by inputting only the rear wheel brake, the CBS operates to interlock the front wheel brake. Other than the above example, the object of the test can include a two-wheeled motor vehicle in which the ABS operates for both the front wheel brake and the rear wheel brake, respectively, and the CBS will not operate by inputting only the front wheel brake, but by inputting only the rear wheel brake, the CBS operates to interlock the front wheel brake. The present invention can correspond easily to test this type of two-wheeled motor vehicle by simply omitting the determination of the CBS during the aforementioned front wheel ABS/CBS test. Moreover, in order to test a two-wheeled motor vehicle in which the ABS operates for both the front wheel brake and the rear wheel brake, respectively, but is not equipped with a CBS, the present invention can easily cope with this type of vehicle by omitting the aforementioned determination of the CBS in the front wheel ABS/CBS test and the determination of the CBS in the rear wheel ABS/CBS test.

Furthermore, in the present embodiment, the rear wheel R is driven to rotate by the engine of the two-wheeled motor vehicle in the front wheel ABS/CBS test and the rear-wheel ABS/CBS test, but the present invention is not limited thereto, and for example, the operator can set the gear of the vehicle to neutral so that the second rear wheel support roller 6 is driven to rotate by the motor 18 etc. In this example, when the speed reaches the predetermined test start speed (for example, 60 km/h) by the rotation of the second rear wheel support roller 6, the operator turns the clutch 17 off just before inputting the brake.

Moreover, with reference to FIGS. 1 and 2, since the test device 1 according to the present embodiment can move the front wheel stage 9 to an appropriate position simply by rotating the ball screw 37 via the motor 36, the test device can easily cope with various two-wheeled motor vehicles having different distances between the front wheel F and the rear wheel R.

Further, the motor 15 is not used normally, but in testing a type of two-wheeled motor vehicle in which there is no starter and the engine can only by started via kicking or push-start, the operator is to turn on the clutch 12 and start the engine by the motor 15 via the second rear wheel support roller 6 and the rear wheel R.

Although not shown, the test device 1 of the present embodiment includes auxiliary rollers for stabilizing the driven status of the front wheel and the rear wheel, a duct for discharging the exhaust gas of the two-wheeled motor vehicle being tested to the exterior, and so on.

INDUSTRIAL APPLICABILITY

As described above, the present invention not only enables to facilitate the specification of the defective portion of a brake system of a two-wheeled motor vehicle, but also enables to effectively perform the test of the two-wheeled motor vehicle with high accuracy while dramatically reducing the time required for the respective tests, so the present invention can be preferably adopted for testing the brake system of the two-wheeled motor vehicle.

The invention claimed is:

1. A brake system test device of a two-wheeled motor vehicle for testing the operation of an antilock brake system provided on the two-wheeled motor vehicle, the device comprising:

a pair of rotatable supporting rollers having axes arranged in parallel for supporting a front wheel of the two-wheeled motor vehicle;

a pair of rotatable supporting rollers having axes arranged in parallel for supporting a rear wheel of the two-wheeled motor vehicle;

a measuring means for measuring, when the antilock brake system operates for at least one of the two wheels of the two-wheeled motor vehicle, the rotation speed of said wheel via the supporting roller supporting said wheel;

a computing means for computing, based on a value obtained by the measuring means, a waveform accompanying a change in the rotation speed of the wheel generated by the operation of the antilock brake system, the waveform having peak values and transition portions which fall before and after the peak values; and a determination means for determining that the brake system is OK when the peak values of the waveform obtained via the computing means falls within predetermined ranges during predetermined lapse times, and determining that the brake system is OK even if at least one of the peak values could not be extracted from the waveform obtained via the computing means when a transition portion of the waveform falls within a predetermined range during a predetermined lapse time without exceeding an upper limit and falling below a lower limit of the predetermined range during a predetermined lapse time, and determining that the brake system is NG even if at least one of the peak value could not be extracted from the waveform obtained via the computing means when a transition portion of the waveform falls within a predetermined range during a predetermined lapse time and also another transition portion exceeds an upper limit or falls below a lower limit of the predetermined range during a predetermined lapse time.

2. The brake system test device of a two-wheeled motor vehicle according to claim 1, wherein the determination means determines that the brake system is NG when the waveform obtained by the computing means has a transition portion existing within the predetermined range and also having another transition portion exceeding an upper limit or falling below a lower limit of the predetermined range.

3. A brake system test method of a two-wheeled motor vehicle for testing the operation of an antilock brake system provided on the two-wheeled motor vehicle, the method comprising:
a brake input step for rotating a front wheel of the two-wheeled motor vehicle supported by a pair of front wheel support rollers and also rotating a rear wheel of the two-wheeled motor vehicle supported by a pair of rear wheel support rollers and fully inputting a brake of one of the wheels for which the antilock brake system operates;
a measuring step for measuring the rotation speed of the wheel for which the antilock brake system operates by the brake input step via the support roller supporting the wheel;
a computing step for computing, based on the value measured during the measuring step, a waveform generated accompanying the change in rotation speed of the wheel by the operation of the antilock brake system, the waveform having peak values and transition portions which fall before and after the peak values; and
a performance determination step for determining that the brake system is OK when the peak values of the waveform obtained by the computing step falls within predetermined ranges during predetermined lapse times, and determining that the brake system is OK even if at least one of the peak values could not be extracted from the waveform obtained by the computing step when a transition portion of the waveform falls within a predetermined range during a predetermined lapse time without exceeding an upper limit and falling below a lower limit of the predetermined range during a predetermined lapse time, and determining that the brake system is NG even if at least one of the peak values could not be extracted from the waveform obtained by the computing step when a transition portion of the waveform falls within a predetermined range during a predetermined lapse time and also another transition portion exceeds an upper limit or falls below a lower limit of the predetermined range during a predetermined lapse time.

4. The brake system test method of a two-wheeled motor vehicle according to claim 3, wherein
the transition portions of the waveform include at least a first transition portion representing the change in rotation speed of the wheel that occurs when the brake is initially turned off by the operation of the antilock brake system, a second transition portion representing the change in rotation speed of the wheel that occurs when the brake is subsequently turned on, and a third transition portion representing the change in rotation speed of the wheel that occurs when the brake is subsequently turned off, is computed in the computing step; and
the brake system is determined as being OK when each of the peak values associated with the transition portions obtained during the computing step falls within a predetermined range during a predetermined lapse time set for each of the transition portions, respectively, and that the brake system is determined as being OK even if at least one of the peak values could not be extracted from the waveform obtained by the computing step when any of the transition portions obtained during the computing step falls within predetermined range during a predetermined lapse time set for each of the transition portions without exceeding an upper limit and falling below a lower limit of the predetermined range during a predetermined lapse time set for each of the transition portions, respectively, and the brake system is determined as being NG even if at least one of the peak values could not be extracted from the waveform obtained by the computing step when any of the transition portions obtained during the computing step falls within predetermined range during a predetermined lapse time set for each of the transition portions, respectively, and also another transition portion exceeds an upper limit or falls below a lower limit of the predetermined range during a predetermined lapse time set for each of the transition portions.

5. The brake system test method of a two-wheeled motor vehicle according to claim 4, wherein the brake system is determined as being NG when the waveform obtained by the computing means has a transition portion existing within the predetermined range and also having another transition portion exceeding an upper limit or falling below a lower limit of the predetermined range during a predetermined lapse time in the performance determination process.

6. The brake system test method of a two-wheeled motor vehicle according to claim 3, wherein the brake system is determined as being NG when the waveform obtained by the computing means has a transition portion existing within the predetermined range and also having another transition portion exceeding an upper limit or falling below a lower limit of the predetermined range during a predetermined lapse time in the performance determination process.

7. A brake system test device of a two-wheeled motor vehicle for testing the operation of a front-rear wheel interlock brake system provided on the two-wheeled motor vehicle having an antilock brake system, the device comprising:
a pair of rotatable front wheel supporting rollers having axes arranged in parallel for supporting a front wheel of the two-wheeled motor vehicle;
a pair of rotatable rear wheel supporting rollers having axes arranged in parallel for supporting a rear wheel of the two-wheeled motor vehicle;
a measuring means connected to one of the front wheel support rollers and one of the rear wheel support rollers, respectively, for measuring a rotation speed of the front wheel and a rotation speed of the rear wheel, respectively, via each of the rollers;
a computing means for computing, based on the values measured via the respective measuring means, when the front wheel and the rear wheel are rotated in an interlocked manner and the antilock brake system is operated respectively for the front wheel and the rear wheel, a waveform representing a difference between a speed change of the front wheel that occurs when the brake is initially turned off by the front wheel antilock brake system and the speed change of the rear wheel that occurs when the brake is initially turned off by the rear wheel antilock brake system, the waveform having peak values and transition portions which fall before and after the peak values; and a determination means for determining that the brake system is OK when the peak values of the waveform obtained by the computing means falls within predetermined ranges during predetermined lapse times, and determining that the brake system is OK even if at least one of the peak values could not be extracted from the waveform obtained by the computing means when a transition portion of the waveform falls within a predetermined range during a predetermined lapse time without exceeding an upper limit and falling below a lower limit of the predetermined range during a predetermined lapse time, and determining that the brake system is NG even if at least one of the peak values could not be extracted from the waveform obtained by the computing means when a transition portion of the waveform falls within a predetermined range during a predetermined lapse time and also another transition portion exceeds an upper limit or falls below a lower limit of the predetermined range during a predetermined lapse time.

8. A brake system test method of a two-wheeled motor vehicle for testing the operation of a front-rear wheel interlock brake system provided on the two-wheeled motor vehicle having an antilock brake system, the method comprising:

a brake input step for rotating a front wheel of the two-wheeled motor vehicle supported by a pair of front wheel support rollers and rotating a rear wheel of the two-wheeled motor vehicle supported by a pair of rear wheel support rollers, and fully inputting the brake for one of the wheels in order to operate the antilock brake system and the front-rear wheel interlock brake system;

a measuring step for measuring a rotation speed of the front wheel and a rotation speed of the rear wheel during the brake input step via respective support rollers;

a computing step for computing, based on the measurements obtained in the measuring step, a waveform representing a difference between a speed change of the front wheel that occurs when the brake is initially turned off by the operation of the front wheel antilock brake system and a speed change of the rear wheel that occurs when the brake is initially turned off by the operation of the rear wheel antilock brake system, the waveform having peak values and transition portions which fall before and after the peak values; and a performance determination step for determining that the brake system is OK when the peak values of the waveform obtained by the computing step falls within predetermined ranges during predetermined lapse times, and determining that the brake system is OK even if at least one of the peak values could not be extracted from the waveform obtained by the computing step when a transition portion of the waveform falls within a predetermined range during a predetermined lapse time without exceeding an upper limit and falling below a lower limit of the predetermined range during a predetermined lapse time, and determining that the brake is NG even if at least one of the peak values could not be extracted from the waveform obtained by the computing step when a transition portion of the waveform falls within a predetermined range during a predetermined lapse time and also another transition portion exceeds an upper limit or falls below a lower limit of the predetermined range during a predetermined lapse time.

9. The brake system test method of a two-wheeled motor vehicle according to claim 8, wherein during the performance determination step, it is determined as NG when the waveform obtained by the computing means has a transition portion thereof existing within the predetermined range and has another transition portion exceeding the upper limit or falling below the lower limit of the predetermined range during a predetermined lapse time.

* * * * *